(12) United States Patent
Morota (10) Patent No.: US 10,377,456 B2
(45) Date of Patent: Aug. 13, 2019

(54) JET PROPELLED WATERCRAFT AND JET PROPULSION ASSEMBLY (71) Applicant: YAMAHA HATSUDOKI KABUSHIKI KAISHA, Iwata-shi, Shizuoka (JP)

(72) Inventor: Koichiro Morota, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 370 days.

(21) Appl. No.: 15/381,211

(22) Filed: Dec. 16, 2016

(65) Prior Publication Data
US 2017/0361910 A1 Dec. 21, 2017

(30) Foreign Application Priority Data
Jun. 17, 2016 (JP) .................................. 2016-120650

(51) Int. Cl.
F01N 3/10 (2006.01)
B63H 11/02 (2006.01)
B63H 21/32 (2006.01)
F01N 3/08 (2006.01)
F01N 13/00 (2010.01)
B63B 35/73 (2006.01)

(52) U.S. Cl.
CPC ............. B63H 11/02 (2013.01); B63H 21/32 (2013.01); F01N 3/0807 (2013.01); F01N 3/0814 (2013.01); F01N 13/004 (2013.01); B63B 35/731 (2013.01); B63B 2751/00 (2013.01); F01N 2260/024 (2013.01); F01N 2340/04 (2013.01); F01N 2590/022 (2013.01); Y02T 10/20 (2013.01)

(58) Field of Classification Search
CPC ...... B63H 21/32; F01N 13/004; F01N 3/0807
USPC .......................................................... 60/299
See application file for complete search history.

(56) References Cited

U.S. PATENT DOCUMENTS 5,702,276 A 12/1997 Nakase et al.
6,213,827 B1 * 4/2001 Hattori ................... B63H 21/32
114/55.5
9,926,063 B2 * 3/2018 Morota .................. B63H 11/02

FOREIGN PATENT DOCUMENTS

JP 8-296432 A 11/1996

* cited by examiner

Primary Examiner — Jason D Shanske
(74) Attorney, Agent, or Firm — Keating and Bennett, LLP (57) ABSTRACT A jet propelled watercraft includes a watercraft body, an engine housed in the watercraft body, a jet propulsion unit that suctions and jets water with a drive force of the engine, a first exhaust pipe connected to an exhaust port of the engine, and a catalyst storage connected to the first exhaust pipe, wherein the first exhaust pipe and the catalyst storage are integral and unitary with each other.

20 Claims, 4 Drawing Sheets

FIG.7 CROSS-SECTION ALONG LINE I-I

JET PROPELLED WATERCRAFT AND JET PROPULSION ASSEMBLY

CROSS-REFERENCE TO RELATED APPLICATION

This application claims priority to Patent Application No. 2016-120650 filed in Japan on Jun. 17, 2016, the entire contents of which are hereby incorporated herein by reference.

BACKGROUND OF THE INVENTION

1. Field of the Invention

The present invention relates to a jet propelled watercraft and a jet propulsion assembly, and more particularly, it relates to a jet propelled watercraft and a jet propulsion assembly each including an exhaust pipe connected to an engine.

2. Description of the Related Art

A jet propelled watercraft including an exhaust pipe connected to an engine is known in general. Such a jet propelled watercraft including an exhaust pipe connected to an engine is disclosed in Japanese Patent Laid-Open No. 8-296432, for example.

Japanese Patent Laid-Open No. 8-296432 discloses a watercraft (jet propelled watercraft) including an engine and an air exhauster that discharges exhaust gas from the engine. In this watercraft, the air exhauster includes a lead-out portion (exhaust pipe) as an exhaust pipe connected to the engine and an expansion portion as an exhaust pipe connected to the lead-out portion, in which a catalytic converter is housed. In the air exhauster, the lead-out portion and the expansion portion are provided as separate exhaust pipes.

In the watercraft described in Japanese Patent Laid-Open No. 8-296432, the exhaust pipe (lead-out portion) through which the exhaust gas of the engine is led out and the exhaust pipe (expansion portion) in which a catalyst is housed are provided as separate exhaust pipes, and hence it is necessary to connect the exhaust pipe (lead-out portion) through which the exhaust gas of the engine is led out and the exhaust pipe (expansion portion) in which the catalyst is housed to each other by a connector such as a bolt. Thus, the structure of an exhaust passage through which the exhaust gas internally passes is complicated as in the watercraft described in Japanese Patent Laid-Open No. 8-296432.

SUMMARY OF THE INVENTION

Preferred embodiments of the present invention provide a jet propelled watercraft and a jet propulsion assembly that simplify the structure of an exhaust passage.

A jet propelled watercraft according to a preferred embodiment of the present invention includes a watercraft body, an engine housed in the watercraft body, a jet propulsion unit that suctions and jets water with a drive force of the engine, a first exhaust pipe connected to an exhaust port of the engine, and a catalyst storage connected to the first exhaust pipe, and the first exhaust pipe and the catalyst storage are integral and unitary with each other.

In a jet propelled watercraft according to a preferred embodiment of the present invention, the first exhaust pipe and the catalyst storage are integral and unitary with each other. Thus, no connecting member such as a bolt is required unlike the case where the first exhaust pipe and the catalyst storage are separately provided, and hence the number of components of an exhaust passage is reduced. Consequently, the structure of the exhaust passage is simplified. Furthermore, no connecting member such as a bolt is required, and no flange or the like used when the first exhaust pipe and the catalyst storage are fastened to each other with a connecting member such as a bolt is required such that the weight of the exhaust passage is reduced. Thus, an increase in the weight of the watercraft body in which the engine is housed is reduced or prevented.

In a jet propelled watercraft according to a preferred embodiment of the present invention, a side surface of the catalyst storage preferably faces a side surface of the first exhaust pipe, and the side surface of the catalyst storage and the side surface of the first exhaust pipe are preferably integral and unitary with each other. Accordingly, the catalyst storage is located close to the first exhaust pipe, and hence the exhaust passage is reduced in size. As used herein, "close to" indicates adjacent to or in a vicinity of. Due to the reduction in the size of the exhaust passage, the exhaust passage is reduced in weight, and hence an increase in the weight of the watercraft body in which the engine is housed is reduced or prevented.

In this case, the first exhaust pipe preferably includes a first cooling water passage, the catalyst storage preferably includes a second cooling water passage, and the first cooling water passage and the second cooling water passage preferably share and define a common cooling water passage in a portion in which the side surface of the catalyst storage and the side surface of the first exhaust pipe are integral and unitary with each other. Accordingly, the catalyst storage is located closer to the first exhaust pipe as compared with the case where the first cooling water passage and the second cooling water passage are provided independently of each other, and hence the exhaust passage is further reduced in size. Due to the further reduction in the size of the exhaust passage, the exhaust passage is further reduced in weight, and hence an increase in the weight of the watercraft body in which the engine is housed is further reduced or prevented.

In a jet propelled watercraft according to a preferred embodiment of the present invention, the catalyst storage preferably overlaps with a side surface of the engine, on which the exhaust port is provided, in a side view of the jet propelled watercraft, and the first exhaust pipe preferably includes a bent portion that extends forward of the exhaust port, is bent back, and extends rearward. Accordingly, the catalyst storage overlaps with the side surface of the engine in the side view such that an increase in the size of the watercraft body in a vertical direction or a longitudinal direction is significantly reduced or prevented as compared with the case where the catalyst storage is totally outside of the side surface of the engine in the side view. Furthermore, the catalyst storage overlaps with the side surface of the engine, on which the exhaust port is provided, in the side view such that the catalyst storage is located closer to the exhaust port as compared with the case where the catalyst storage is totally outside of the side surface of the engine in the side view. Consequently, the length of the exhaust pipe (first exhaust pipe) that connects the exhaust port to the catalyst storage is reduced. Thus, an increase in the weight of the exhaust pipe (first exhaust pipe) that connects the exhaust port to the catalyst storage is significantly reduced or prevented. Consequently, an increase in the weight of the watercraft body in which the engine is housed is significantly reduced or prevented. In addition, the bent portion is provided in the first exhaust pipe such that the first exhaust pipe extends forward and thereafter extends rearward due to the bent portion, and hence the first exhaust pipe and the catalyst storage are connected to each other at a position that is farther forward as compared with the case where the first exhaust pipe extends only rearward of the exhaust port. Consequently, the catalyst storage is located at a more forward position, and hence the catalyst storage is easily located at a position at which the catalyst storage overlaps with the side surface of the engine.

In this case, the exhaust port preferably includes a plurality of exhaust ports provided on the side surface of the engine, and the bent portion of the first exhaust pipe preferably extends forward of a forward most exhaust port of the plurality of exhaust ports, is bent back, and extends rearward. Accordingly, even in the structure in which the plurality of exhaust ports are provided on the side surface of the engine, the catalyst storage is located forward such that the catalyst storage is easily located at the position at which the catalyst storage overlaps with the side surface of the engine.

In a structure in which the first exhaust pipe includes the bent portion, the bent portion preferably overlaps with the side surface of the engine in the side view. Accordingly, the bent portion is provided such that an increase in the size of the watercraft body in the vertical direction or the longitudinal direction is significantly reduced or prevented.

In a structure in which the first exhaust pipe includes the bent portion, the bent portion is preferably bent back near a front end of the engine. Accordingly, the length of the bent portion of the first exhaust pipe is reduced as compared with the case where the bent portion of the first exhaust pipe is bent back at a forward position relative to the front end of the engine. Consequently, an increase in the weight of the first exhaust pipe is significantly reduced or prevented. Thus, an increase in the weight of the watercraft body in which the engine is housed is significantly reduced or prevented.

In a structure in which the first exhaust pipe includes the bent portion, a portion of the bent portion before being bent to extend rearward and a portion of the bent portion after being bent to extend rearward preferably overlap with each other in the side view. Accordingly, the portion of the bent portion before being bent to extend rearward and the portion of the bent portion after being bent to extend rearward are located close to each other, and hence the length of the bent portion is reduced. Consequently, an increase in the weight of the first exhaust pipe is significantly reduced or prevented. Thus, an increase in the weight of the watercraft body in which the engine is housed is significantly reduced or prevented.

In a structure in which the first exhaust pipe includes the bent portion, the first exhaust pipe preferably further includes a lead-out portion that connects the exhaust port of the engine to the bent portion and an increased diameter portion that connects the bent portion to the catalyst storage. Accordingly, the diameter of the first exhaust pipe is increased only in a portion (increased diameter portion) in which the first exhaust pipe is connected to the catalyst storage, and hence the lead-out portion and the bent portion are small. Consequently, an increase in the weight of the first exhaust pipe is significantly reduced or prevented, and hence an increase in the weight of the watercraft body in which the engine is housed is significantly reduced or prevented.

In a jet propelled watercraft according to a preferred embodiment of the present invention, a bottom of an exhaust gas passage of the first exhaust pipe is preferably located below the exhaust port. Accordingly, when moisture in the exhaust gas is condensed to generate condensed water, accumulation of the condensed water between the exhaust port and the first exhaust pipe is significantly reduced or prevented. Consequently, blockage of the exhaust gas flow caused by the accumulation of the condensed water is significantly reduced or prevented.

In this case, the jet propelled watercraft preferably further includes a second exhaust pipe connected to the catalyst storage and a water lock connected to the second exhaust pipe, and a bottom of an exhaust gas passage of the catalyst storage is preferably located at a same or substantially a same height as the bottom of the exhaust gas passage of the first exhaust pipe or located below the bottom of the exhaust gas passage of the first exhaust pipe, a bottom of an exhaust gas passage of the second exhaust pipe is preferably located at a same or substantially a same height as the bottom of the exhaust gas passage of the catalyst storage or located below the bottom of the exhaust gas passage of the catalyst storage, and a bottom of an exhaust gas passage of the water lock is preferably located at a same or substantially a same height as the bottom of the exhaust gas passage of the second exhaust pipe or located below the bottom of the exhaust gas passage of the second exhaust pipe. Accordingly, a rising slope in the exhaust gas passage from the exhaust port to the water lock is significantly reduced or prevented. Consequently, accumulation of the condensed water between the exhaust port and the water lock is significantly reduced or prevented. Thus, blockage of exhaust gas flow caused by the accumulation of the condensed water is significantly reduced or prevented. Furthermore, a degradation of the performance of a catalyst in the catalyst storage caused by a decrease in the temperature of the catalyst resulting from the accumulation of the condensed water is significantly reduced or prevented.

A jet propelled watercraft according to a preferred embodiment of the present invention preferably further includes a second exhaust pipe connected to the catalyst storage and a water lock connected to the second exhaust pipe, and the catalyst storage and the water lock are preferably located close to a side of the engine on which the exhaust port is provided, in a plan view of the jet propelled watercraft. Accordingly, both the catalyst storage and the water lock are located close to the side of the engine on which the exhaust port is provided. Consequently, an area in which the engine, the catalyst storage, and the water lock are located is reduced as compared with the case where the catalyst storage and the water lock are located on opposite sides of the engine, respectively, and hence an increase in the size of the watercraft body is significantly reduced or prevented. In this structure, the catalyst storage and the water lock are located close to the side of the engine on which the exhaust port is provided, and hence the length of the exhaust pipe (second exhaust pipe) that connects the catalyst storage to the water lock is reduced as compared with the case where the catalyst storage and the water lock are located on opposite sides of the engine, respectively. Consequently, an increase in the weight of the exhaust pipe (second exhaust pipe) that connects the catalyst storage to the water lock is significantly reduced or prevented. Thus, an increase in the weight of the watercraft body in which the engine is housed is significantly reduced or prevented.

In this case, an upper end of the catalyst storage and an upper end of the water lock are preferably located below an upper end of the engine in a side view of the jet propelled watercraft, and a lower end of the catalyst storage and a lower end of the water lock are preferably located above a lower end of the engine in the side view. Accordingly, an increase in the size of the watercraft body in the vertical direction is significantly reduced or prevented as compared with the case where the upper ends of the catalyst storage and the water lock are located above the upper end of the engine or the lower ends of the catalyst storage and the water lock are located below the lower end of the engine.

In a jet propelled watercraft according to a preferred embodiment of the present invention, the catalyst storage preferably overlaps with the first exhaust pipe in a side view. Accordingly, the catalyst storage and the first exhaust pipe are located close to each other, and hence the length of the first exhaust pipe is reduced. Consequently, an increase in the weight of the first exhaust pipe is significantly reduced or prevented. Thus, an increase in the weight of the watercraft body in which the engine is housed is significantly reduced or prevented.

A jet propulsion assembly according to a preferred embodiment of the present invention includes an engine housed in a watercraft body, a jet propulsion unit that suctions and jets water with a drive force of the engine, an exhaust pipe connected to an exhaust port of the engine, and a catalyst storage connected to the exhaust pipe, and the exhaust pipe and the catalyst storage are integral and unitary with each other.

In a jet propulsion assembly according to a preferred embodiment of the present invention, the exhaust pipe and the catalyst storage are integral and unitary with each other. Thus, no connecting member such as a bolt is required unlike the case where the exhaust pipe and the catalyst storage are separately provided, and hence the number of components of the exhaust passage is reduced. Consequently, the structure of the exhaust passage is simplified. Furthermore, no connecting member such as a bolt is required, and no flange or the like used when the exhaust pipe and the catalyst storage are fastened to each other with a connecting member such as a bolt is required such that the weight of the exhaust passage is reduced. Thus, an increase in the weight of the watercraft body in which the engine is housed is significantly reduced or prevented.

In a jet propulsion assembly according to a preferred embodiment of the present invention, a side surface of the catalyst storage preferably faces a side surface of the exhaust pipe, and the side surface of the catalyst storage and the side surface of the exhaust pipe are preferably integral and unitary with each other. Accordingly, the catalyst storage is located close to the exhaust pipe, and hence an area in which the exhaust passage is located is reduced. Consequently, the exhaust passage is reduced in size. Due to the reduction in the size of the exhaust passage, the exhaust passage is reduced in weight, and hence an increase in the weight of the watercraft body in which the engine is housed is significantly reduced or prevented.

In this case, the exhaust pipe preferably includes a first cooling water passage, the catalyst storage preferably includes a second cooling water passage, and the first cooling water passage and the second cooling water passage preferably share and define a common cooling water passage in a portion of the exhaust pipe in which the side surface of the catalyst storage and the side surface of the exhaust pipe are integral and unitary with each other. Accordingly, the catalyst storage is located closer to the exhaust pipe as compared with the case where the first cooling water passage and the second cooling water passage are provided independently of each other, and hence the area in which the exhaust passage is located is further reduced such that the exhaust passage is further reduced in size. Due to the further reduction in the size of the exhaust passage, the exhaust passage is further reduced in weight, and hence an increase in the weight of the watercraft body in which the engine is housed is further significantly reduced or prevented.

In a jet propulsion assembly according to a preferred embodiment of the present invention, the catalyst storage preferably overlaps with a side surface of the engine on which the exhaust port is provided, in a side view of the jet propulsion assembly, and the exhaust pipe preferably includes a bent portion that extends forward of the exhaust port, is bent back, and extends rearward. Accordingly, the catalyst storage overlaps with the side surface of the engine in the side view such that an increase in the size of the watercraft body in a vertical direction or a longitudinal direction is significantly reduced or prevented as compared with the case where the catalyst storage is totally outside of the side surface of the engine in the side view. Furthermore, the catalyst storage overlaps with the side surface of the engine on which the exhaust port is provided, in the side view, such that the catalyst storage is located closer to the exhaust port as compared with the case where the catalyst storage is totally outside of the side surface of the engine in the side view. Consequently, the length of the exhaust pipe that connects the exhaust port to the catalyst storage is reduced. Thus, an increase in the weight of the exhaust pipe that connects the exhaust port to the catalyst storage is significantly reduced or prevented. Consequently, an increase in the weight of the watercraft body in which the engine is housed is significantly reduced or prevented. In addition, the bent portion is provided in the exhaust pipe such that the exhaust pipe extends forward and thereafter extends rearward due to the bent portion, and hence the exhaust pipe and the catalyst storage are connected to each other at a position that is farther forward as compared with the case where the exhaust pipe extends only rearward of the exhaust port. Consequently, the catalyst storage is located at a more forward position, and hence the catalyst storage is easily located at a position at which the catalyst storage overlaps with the side surface of the engine.

A jet propulsion assembly according to a preferred embodiment of the present invention includes an engine housed in a watercraft body, a jet propulsion unit that suctions and jets water with a drive force of the engine, an exhaust pipe connected to an exhaust port of the engine, and a catalyst storage connected to the exhaust pipe. The exhaust pipe includes a lead-out portion connected to the exhaust port in which exhaust gas discharged from the exhaust port is led out, and a bent portion that is connected to the lead-out portion, extends forward from the lead-out portion, is bent back, and extends rearward. The lead-out portion and the bent portion are integral and unitary with each other, and the bent portion is bent back near a front end of the engine.

In a jet propulsion assembly according to a preferred embodiment of the present invention, the lead-out portion and the bent portion are integral and unitary with each other. Thus, no connecting member such as a bolt is required unlike the case where the lead-out portion and the bent portion are separately provided, and hence the number of components of the exhaust passage is reduced. Consequently, the structure of the exhaust passage is simplified even when the bent portion is provided. Furthermore, the bent portion is provided such that the exhaust pipe extends forward and thereafter extends rearward due to the bent portion, and hence the exhaust pipe and the catalyst storage are connected to each other at a position that is farther forward as compared with the case where the exhaust pipe extends only rearward of the exhaust port. Consequently, the catalyst storage is located at a more forward position, and hence the catalyst storage is easily located at a position at which the catalyst storage overlaps with a side surface of the engine. In addition, the bent portion is bent back near the front end of the engine such that the length of the bent portion of the exhaust pipe is reduced as compared with the case where the bent portion of the exhaust pipe is bent back at a forward position relative to the front end of the engine. Consequently, an increase in the weight of the exhaust pipe is significantly reduced or prevented. Thus, an increase in the weight of the watercraft body in which the engine is housed is significantly reduced or prevented.

In a jet propulsion assembly according to a preferred embodiment of the present invention, the exhaust pipe and the catalyst storage are preferably integral and unitary with each other. Accordingly, no connecting member such as a bolt is required unlike the case where the exhaust pipe and the catalyst storage are separately provided, and hence the number of components of the exhaust passage is reduced. Consequently, the structure of the exhaust passage is simplified. Furthermore, an increase in the weight of the exhaust passage is significantly reduced or prevented, and hence an increase in the weight of the watercraft body in which the engine is housed is significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings. In the following description, a front-back direction, a vertical direction, and a right-left direction are directions relative to a jet propelled watercraft 1. More specifically, the forward movement direction (along arrow FWD) of the jet propelled watercraft 1 is a front side, and the backward movement direction (along arrow BWD) of the jet propelled watercraft 1 is a rear side. A right side with respect to the forward movement direction of the jet propelled watercraft 1 is the right, and a left side with respect to the forward movement direction of the jet propelled watercraft 1 is the left. In the following description, the front-back direction is also referred to as the longitudinal direction of a watercraft body 2, and the right-left direction is also referred to as the width direction of the watercraft body 2.

The structure of the jet propelled watercraft 1 according to a preferred embodiment of the present invention is now described with reference to FIGS. 1 to 7.

Figure 1:
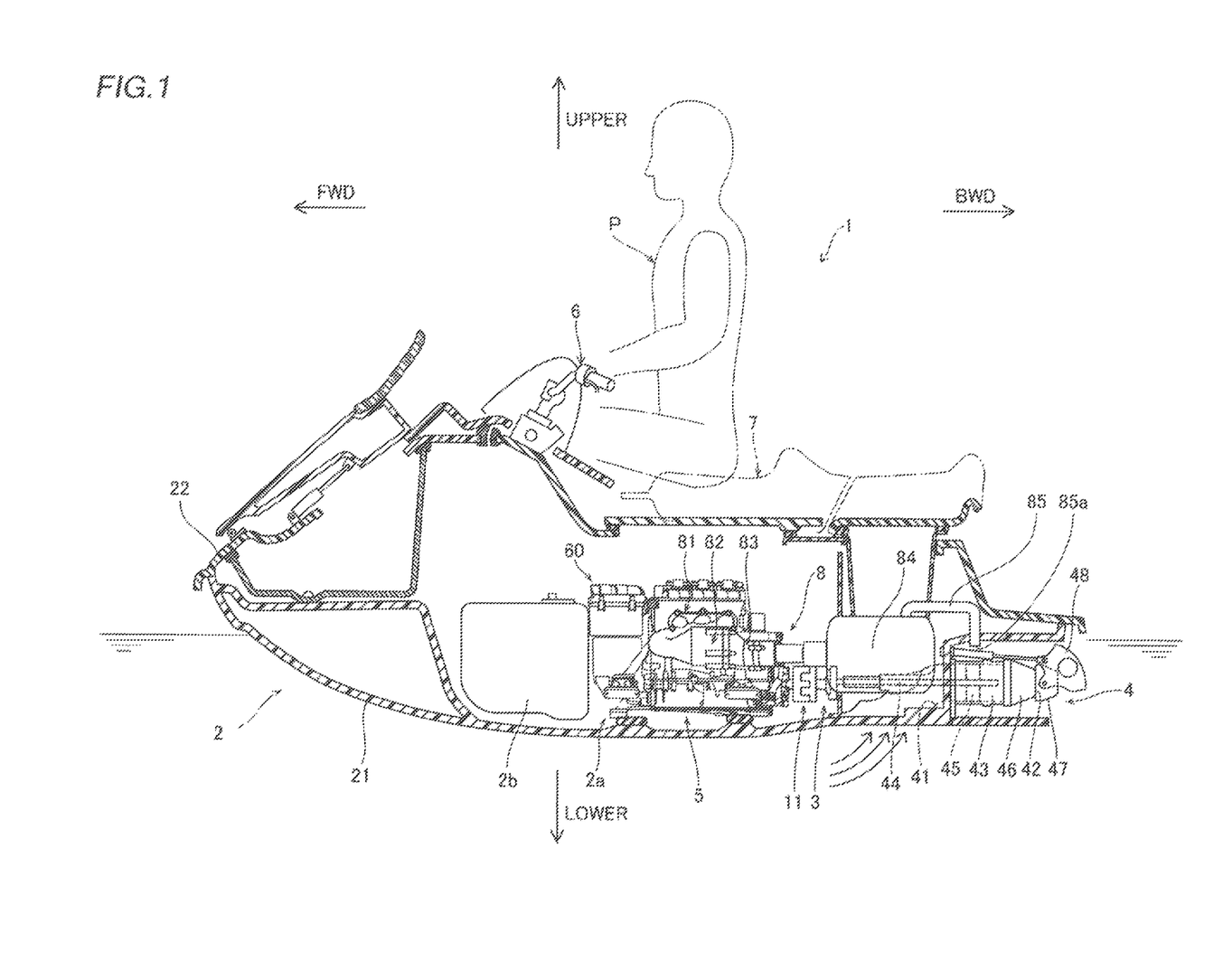
FIG. 1 is a diagram showing a jet propelled watercraft according to a preferred embodiment of the present invention.

As shown in FIG. 1, the jet propelled watercraft 1 includes the watercraft body 2 and a jet propulsion assembly (jet propulsion mechanism) 3. The jet propulsion assembly 3 includes a jet propulsion unit 4 and an engine 5. The jet propelled watercraft 1 includes a handle 6 and a seat 7. The handle 6 is operated to the right and left by a crew member P. The crew member P sits on the seat 7.

The watercraft body 2 includes a hull 21 that floats on the surface of water and a deck 22 located above the surface of water. The deck 22 is located above the hull 21 including a watercraft bottom. The engine 5 is located between the hull 21 and the deck 22 in the vertical direction. The engine 5 is housed in an engine room 2a provided inside the watercraft body 2. In the engine room 2a, a fuel tank 2b is also housed. The jet propulsion unit 4 is located behind the engine 5. The seat 7 is located above the engine 5. The handle 6 is located in front of a seating surface of the seat 7. The handle 6 and the seat 7 are located above the watercraft body 2.

The jet propulsion unit 4 suctions and jets water with the drive force of the engine 5. The jet propulsion unit 4 includes a water inlet 41, a water outlet 42, and a flow passage 43. The water inlet 41 is open at the watercraft bottom. The water suctioned through the water inlet 41 is jetted rearward from the water outlet 42. The water suctioned through the water inlet 41 is guided to the water outlet 42 through the flow passage 43.

The jet propulsion unit 4 includes a drive shaft 44, an impeller 45, a nozzle 46, a deflector 47, and a bucket 48. A front end of the drive shaft 44 is located in the engine room 2a. A back end of the drive shaft 44 is located in the flow passage 43. The front end of the drive shaft 44 is mounted on the engine 5 through a coupling 11. The impeller 45 is mounted in the vicinity of the back end of the drive shaft 44. The impeller 45 is located in the flow passage 43. The impeller 45 rotates with the rotation of the drive shaft 44.

The nozzle 46 includes the water outlet 42. The nozzle 46 is located behind the impeller 45. The deflector 47 is mounted on the nozzle 46. The deflector 47 is located behind the nozzle 46. The deflector 47 rotates in the right-left direction with respect to the nozzle 46 about an axis that extends in the vertical direction. Thus, the deflector 47 changes the direction of the water jetted from the nozzle 46 in the right-left direction. The deflector 47 rotates in the right-left direction in response to operation of the handle 6. The bucket 48 is located behind the deflector 47. The bucket 48 rotates in the vertical direction with respect to the deflector 47 about an axis that extends in the right-left direction. Thus, the bucket 48 changes the direction of the water jetted from the deflector 47 to the forward direction or the rearward direction. The bucket 48 rotates in the vertical direction in response to operation of a shift lever (not shown).

The crew member P operates a throttle lever (not shown) provided on the handle 6 to adjust the output of the engine 5. When the engine 5 rotates the drive shaft 44, the impeller 45 is rotated with the drive shaft 44. Consequently, a force to suction water outside the watercraft into the flow passage 43 through the water inlet 41 is generated. The water suctioned into the flow passage 43 passes through the impeller 45, the nozzle 46, and the deflector 47 in this order, and is jetted rearward from the deflector 47. Thus, a thrust to propel the jet propelled watercraft 1 is generated. The direction of the water jetted from the deflector 47 is changed to the right-left direction by the rotation of the deflector 47 in the right-left direction in response to operation of the handle 6. The direction of the water jetted from the deflector 47 is changed from the forward direction to the rearward direction by the rotation of the bucket 48 in a downward direction in response to operation of the shift lever, and is changed from the rearward direction to the forward direction by the rotation of the bucket 48 in an upward direction in response to operation of the shift lever. Consequently, the jet propelled watercraft 1 is steered.

Figure 2:
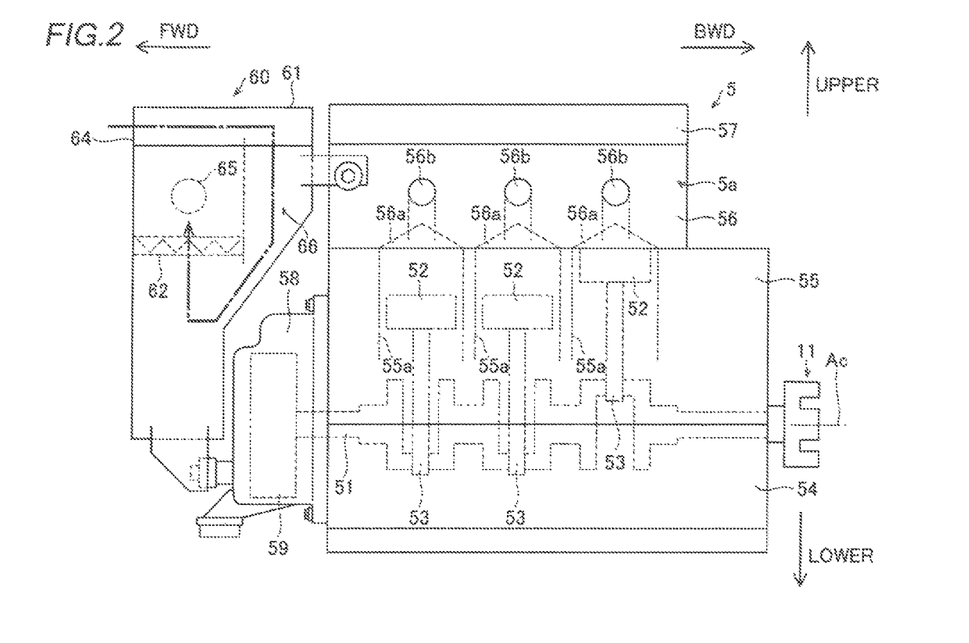
FIG. 2 is a side elevational view schematically showing an engine of a jet propelled watercraft according to a preferred embodiment of the present invention.

As shown in FIG. 2, the engine 5 is an internal combustion engine. The engine 5 is preferably an in-line engine. The engine 5 includes a crankshaft 51, a plurality of (for example, three in a preferred embodiment of the present invention) pistons 52, and a plurality of (for example, three in a preferred embodiment of the present invention) connecting rods 53. The crankshaft 51 is rotatable about the axis Ac of the crankshaft that extends in the front-back direction. A back end of the crankshaft 51 is mounted to the jet propulsion unit 4 (see FIG. 1) through the coupling 11. A front end of the crankshaft 51 is mounted to a power generator 59 described below. Each of the pistons 52 reciprocates in the vertical direction according to the rotation of the crankshaft 51. Each of the connecting rods 53 couples a corresponding piston 52 to the crankshaft 51.

Figure 3:
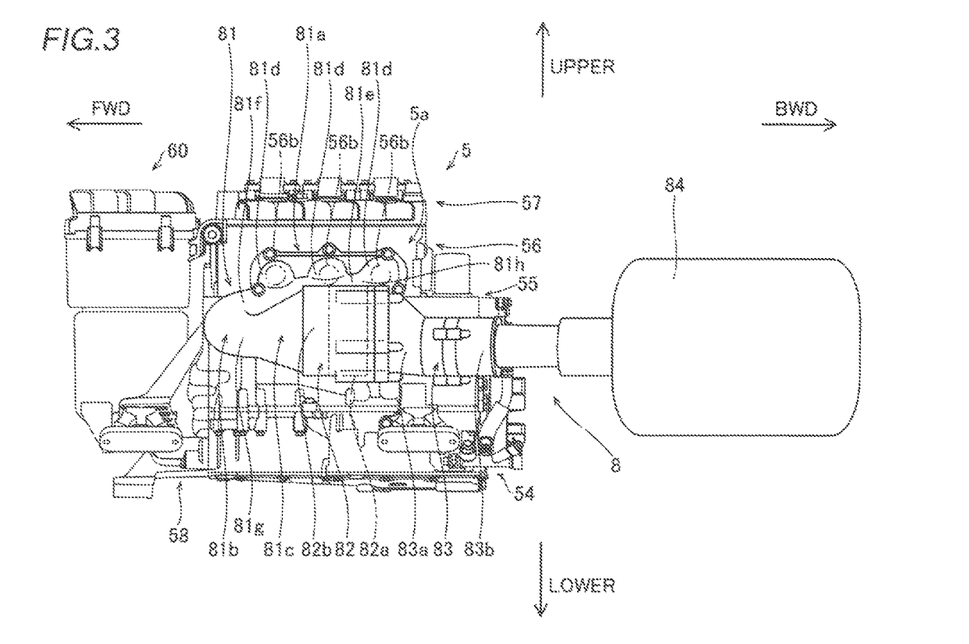
FIG. 3 is a side elevational view showing an engine of a jet propelled watercraft according to a preferred embodiment of the present invention.

As shown in FIGS. 2 and 3, the engine 5 includes a crank case 54, a cylinder body 55, a cylinder head 56, and a cylinder head cover 57. The crank case 54 as well as the cylinder body 55 houses the crankshaft 51. The cylinder body 55 is provided with a plurality of (for example, three in a preferred embodiment of the present invention) cylinders 55a that contain the plurality of pistons 52, respectively. The cylinder head 56 is provided with a plurality of (for example, three in a preferred embodiment of the present invention) combustion chambers 56a, a plurality of (for example, three in a preferred embodiment of the present invention) exhaust ports 56b, and a plurality of intake ports (not shown). The plurality of exhaust ports 56b are provided on a side surface 5a of the engine 5 in the width direction, which is orthogonal to the longitudinal direction (front-back direction), of the watercraft body 2. The side surface 5a includes side surfaces of the crank case 54, the cylinder body 55, the cylinder head 56, and the cylinder head cover 57. The plurality of exhaust ports 56b are aligned in the front-back direction. The cylinder head cover 57 covers the cylinder head 56. The crank case 54, the cylinder body 55, the cylinder head 56, and the cylinder head cover 57 are aligned in the vertical direction, in this order, from the bottom.

In the jet propulsion assembly 3, a case cover 58 is mounted on the engine 5. The case cover 58 is located below the cylinder head 56. The case cover 58 is located in front of the crank case 54 and the cylinder body 55. The case cover 58 houses the power generator 59. The power generator 59 converts the power of the engine 5 to electric power by the relative rotation of a rotor (not shown) with respect to a stator (not shown) due to the rotation of the crankshaft 51.

The jet propulsion assembly 3 includes an air intake apparatus 60. The air intake apparatus 60 is mounted to the engine 5. The air intake apparatus 60 is preferably located in front of the engine 5 and on the right of the engine 5. The air intake apparatus 60 includes an air intake box 61, an air filter 62, and an intake pipe 63 (see FIG. 4). The air intake box 61 houses the air filter 62. The air filter 62 removes extraneous material in the air. The intake pipe 63 guides air discharged from the air intake box 61 to the plurality of combustion chambers 56a through the intake ports.

The air intake box 61 includes an air intake inlet 64, an air intake outlet 65, and an air intake passage 66. The air intake inlet 64 is open at a front upper portion of the air intake box 61. The air suctioned through the air intake inlet 64 is discharged from the air intake outlet 65. The air intake outlet 65 is connected to the intake pipe 63. The air intake passage 66 connects the air intake inlet 64 to the air intake outlet 65. In FIG. 2, air flow is shown by a thick one-dot chain line.

As shown in FIGS. 1 and 3 to 6, the jet propulsion assembly 3 includes an exhaust passage 8. The exhaust passage 8 is mounted on the engine 5. Exhaust gas discharged from the plurality of exhaust ports 56b is discharged outward of the watercraft body 2 through the exhaust passage 8. The exhaust passage 8 includes a first exhaust pipe 81, a catalyst storage 82, a second exhaust pipe 83, a water lock 84, and a third exhaust pipe 85 (see FIG. 1). The first exhaust pipe 81 is an example of the "exhaust pipe."

The exhaust gas discharged from the exhaust ports 56b is led out through the first exhaust pipe 81. The catalyst storage 82 stores a catalyst member 82a (see FIGS. 3 and 4) that enhances the reaction of a component (such as HC, CO, or NOx) contained in the exhaust gas. The second exhaust pipe 83 guides the exhaust gas passing through the catalyst storage 82 to the water lock 84. The water lock 84 significantly reduces or prevents inflow, toward the engine 5, of water entering from an exhaust opening 85a (see FIG. 1) through which the exhaust gas is externally discharged. The third exhaust pipe 85 discharges the exhaust gas discharged from the exhaust ports 56b outward of the watercraft body 2 (into the water).

Figure 6:
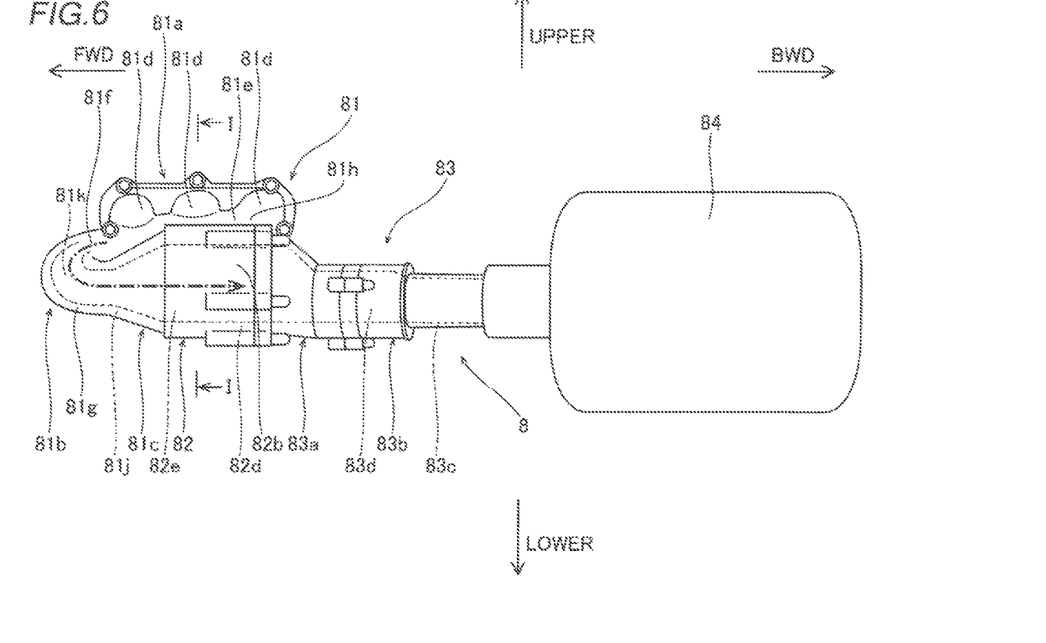
FIG. 6 is a side elevational view showing a first exhaust pipe, a catalyst storage, a second exhaust pipe, and a water lock of a jet propelled watercraft according to a preferred embodiment of the present invention.

An upstream portion of the first exhaust pipe 81 in the flow direction of the exhaust gas is connected to the exhaust ports 56b. A downstream portion of the first exhaust pipe 81 in the flow direction of the exhaust gas is connected to the catalyst storage 82. An upstream portion of the catalyst storage 82 in the flow direction of the exhaust gas is connected to the first exhaust pipe 81. A downstream portion of the catalyst storage 82 in the flow direction of the exhaust gas is connected to the second exhaust pipe 83. An upstream portion of the second exhaust pipe 83 in the flow direction of the exhaust gas is connected to the catalyst storage 82. A downstream portion of the second exhaust pipe 83 in the flow direction of the exhaust gas is connected to the water lock 84. An upstream portion of the water lock 84 in the flow direction of the exhaust gas is connected to the second exhaust pipe 83. A downstream portion of the water lock 84 in the flow direction of the exhaust gas is connected to the third exhaust pipe 85. An upstream portion of the third exhaust pipe 85 in the flow direction of the exhaust gas is connected to the water lock 84. A downstream end of the third exhaust pipe 85 in the flow direction of the exhaust gas opens outward of the watercraft body 2. The downstream end of the third exhaust pipe 85 includes the exhaust opening 85a. In the exhaust passage 8, the exhaust gas passes through the first exhaust pipe 81, the catalyst storage 82, the second exhaust pipe 83, the water lock 84, and the third exhaust pipe 85, in this order, and is discharged outward of the watercraft body 2. In FIG. 6, the flow of the exhaust gas is shown by a thick one-dot chain line.

The first exhaust pipe 81 includes a lead-out portion 81a, a bent portion 81b, and an increased diameter portion 81c. An upstream portion of the lead-out portion 81a in the flow direction of the exhaust gas is connected to the exhaust ports

56*b*. A downstream portion of the lead-out portion 81*a* in the flow direction of the exhaust gas is connected to the bent portion 81*b*. The lead-out portion 81*a* includes a plurality of (for example, three in a preferred embodiment of the present invention) branches 81*d* and a trunk 81*e*. The plurality of branches 81*d* are aligned in the front-back direction. Each of the branches 81*d* is connected to a corresponding exhaust port 56*b*. The trunk 81*e* connects the plurality of branches 81*d* to each other. In the trunk 81*e*, the exhaust gas to be led out from the exhaust ports 56*b* through the branches 81*d* is gathered. The trunk 81*e* extends in the front-back direction.

An upstream portion of the bent portion 81*b* in the flow direction of the exhaust gas is connected to the lead-out portion 81*a*. A downstream portion of the bent portion 81*b* in the flow direction of the exhaust gas is connected to the increased diameter portion 81*c*. The bent portion 81*b* extends forward of a forward most exhaust port 56*b* of the plurality of exhaust ports 56*b*, is bent back, and extends rearward. A portion 81*f* of the bent portion 81*b* before being bent to extend rearward and a portion 81*g* of the bent portion 81*b* after being bent to extend rearward overlap with each other in a side view. In other words, the portion 81*f* of the bent portion 81*b* before being bent to extend rearward and the portion 81*g* of the bent portion 81*b* after being bent to extend rearward are aligned in the width direction. The bent portion 81*b* is bent back near a front end of the engine 5. The bent portion 81*b* is preferably U-shaped or substantially U-shaped.

An upstream portion of the increased diameter portion 81*c* in the flow direction of the exhaust gas is connected to the bent portion 81*b*. A downstream portion of the increased diameter portion 81*c* in the flow direction of the exhaust gas is connected to the catalyst storage 82. The increased diameter portion 81*c* has a sectional area that gradually increases downstream in the flow direction of the exhaust gas.

The catalyst storage 82 stores the catalyst member 82*a*. The catalyst member 82*a* is preferably a columnar member having a honeycomb structure, for example, and a catalyst is supported thereon. The catalyst member 82*a* is fitted into and fixed to an exhaust gas passage 82*e*, described below, of the catalyst storage 82, for example. The catalyst supported on the catalyst member 82*a* efficiently reacts with the components contained in the exhaust gas at a catalytic activation temperature or higher. In order not to decrease the temperature of the exhaust gas that reaches the catalyst member 82*a* to less than the catalytic activation temperature, the catalyst member 82*a* is located in a vicinity of the exhaust ports 56*b* of the engine 5.

The second exhaust pipe 83 includes a decreased diameter portion 83*a* and a straight portion 83*b*. An upstream portion of the decreased diameter portion 83*a* in the flow direction of the exhaust gas is connected to the catalyst storage 82. A downstream portion of the decreased diameter portion 83*a* in the flow direction of the exhaust gas is connected to the straight portion 83*b*. The decreased diameter portion 83*a* has a sectional area that gradually decreases downstream in the flow direction of the exhaust gas. An upstream portion of the straight portion 83*b* in the flow direction of the exhaust gas is connected to the decreased diameter portion 83*a*. A downstream portion of the straight portion 83*b* in the flow direction of the exhaust gas is connected to the water lock 84.

According to a preferred embodiment of the present invention, the first exhaust pipe 81 and the catalyst storage 82 are integral and unitary with each other. Specifically, the first exhaust pipe 81 and the catalyst storage 82 are, for example, cast as an integral and unitary structure. Therefore, in the first exhaust pipe 81, the lead-out portion 81*a*, the bent portion 81*b*, and the increased diameter portion 81*c* are, for example, cast together. Thus, no connecting member to connect the lead-out portion 81*a*, the bent portion 81*b*, and the increased diameter portion 81*c* to each other is required, and no connecting member to connect the first exhaust pipe 81 and the catalyst storage 82 to each other is required. The first exhaust pipe 81 and the catalyst storage 82 are preferably cast from metal, such as aluminum.

The lead-out portion 81*a* of the first exhaust pipe 81 and the catalyst storage 82 are aligned in the right-left direction, in this order, from the right in a plan view. The catalyst storage 82 overlaps with the trunk 81*e* of the lead-out portion 81*a* of the first exhaust pipe 81 in the side view.

Figure 4:
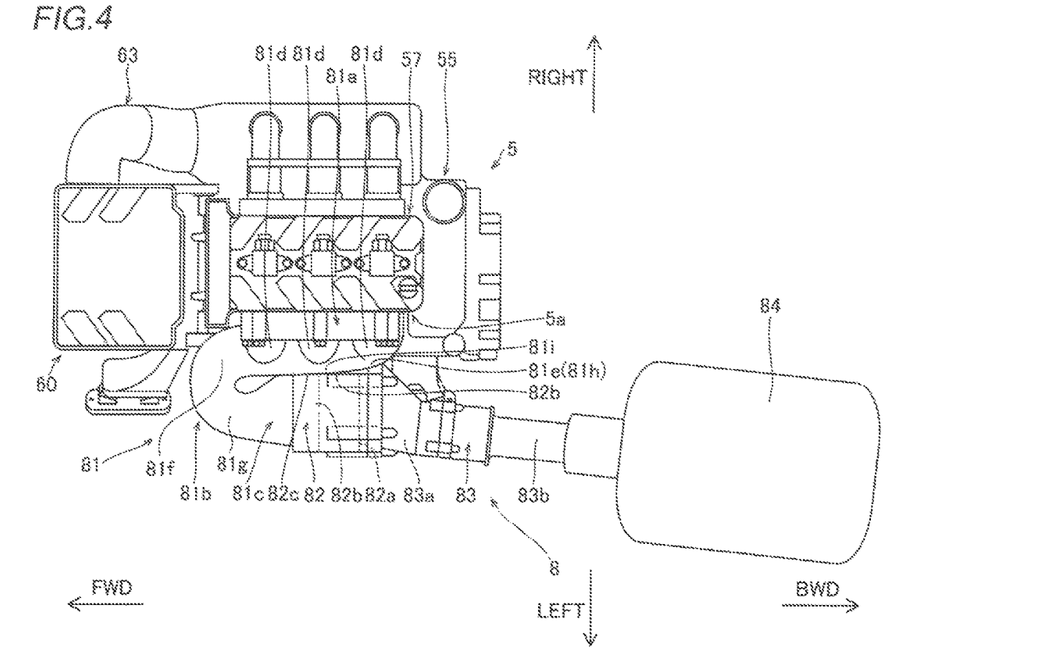
FIG. 4 is a plan view showing an engine of a jet propelled watercraft according to a preferred embodiment of the present invention.
Figure 5:
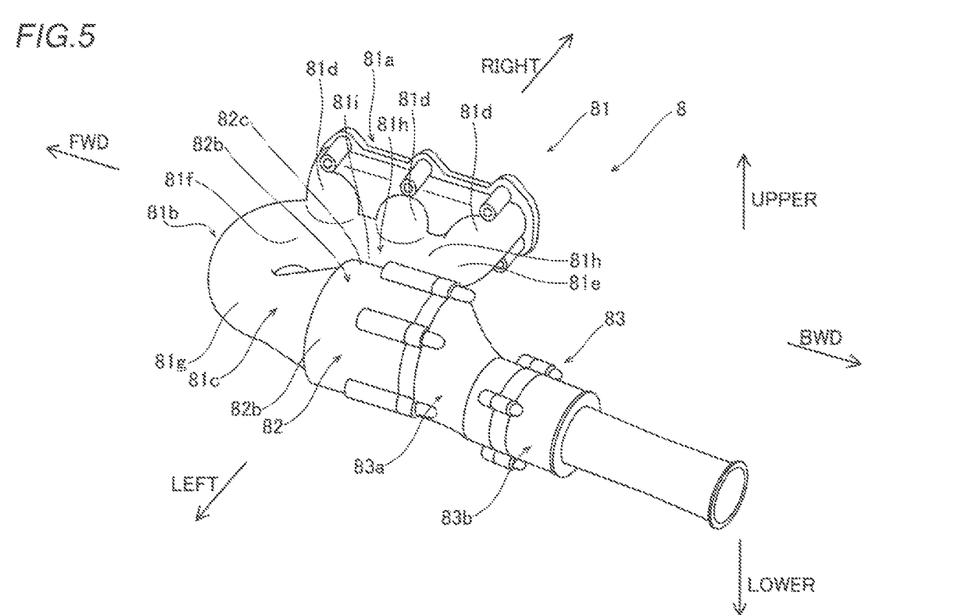
FIG. 5 is a perspective view showing a first exhaust pipe, a catalyst storage, and a second exhaust pipe of a jet propelled watercraft according to a preferred embodiment of the present invention.
Figure 7:
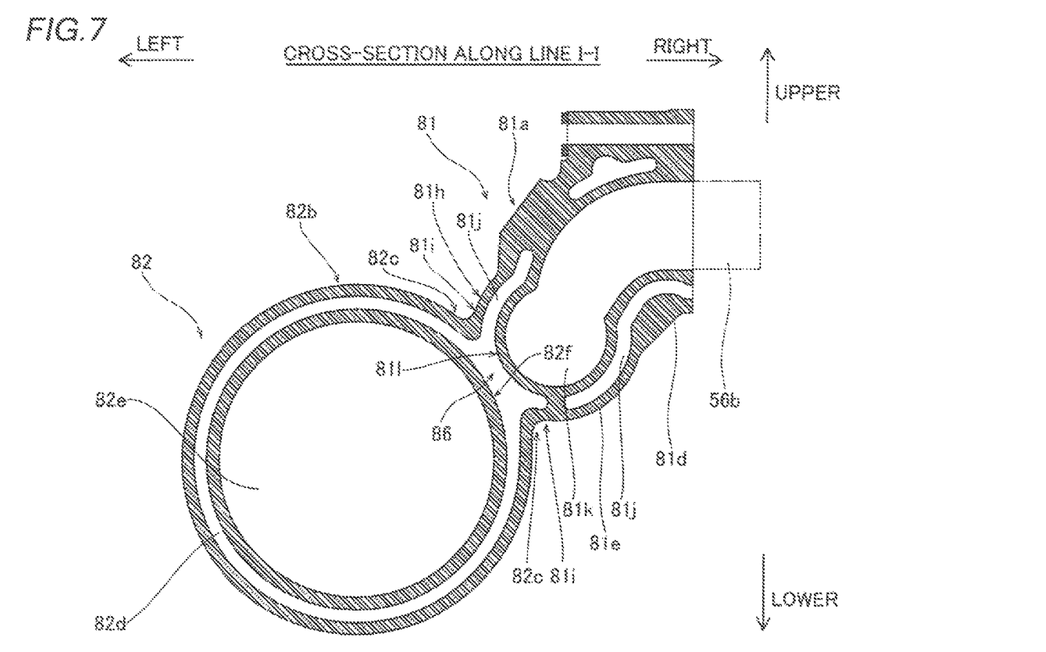
FIG. 7 is a sectional view taken along the line I-I shown in FIG. 6.

According to a preferred embodiment of the present invention, a side surface 82*b* (the outer surface of the catalyst storage 82) of the catalyst storage 82 and a side surface 81*h* (the outer surface of the first exhaust pipe 81) of the trunk 81*e* of the first exhaust pipe 81 face each other in the width direction, as shown in FIGS. 4, 5, and 7. A portion 82*c* (i.e., a right portion of the side surface 82*b* of the catalyst storage 82) of the side surface 82*b* of the catalyst storage 82, which faces the first exhaust pipe 81, and a portion 81*i* (i.e., a left portion of the side surface 81*h* of the trunk 81*e* of the first exhaust pipe 81) of the side surface 81*h* of the trunk 81*e* of the first exhaust pipe 81, which faces the catalyst storage 82, are integral and unitary with each other. Specifically, the portion 82*c* of the side surface 82*b* of the catalyst storage 82, which faces the first exhaust pipe 81, and the portion 81*i* of the side surface 81*h* of the trunk 81*e* of the first exhaust pipe 81, which faces the catalyst storage 82, are, for example, cast together as an integral and unitary structure.

As shown in FIGS. 6 and 7, the first exhaust pipe 81 includes a cooling water passage 81*j*. Water flows through the cooling water passage 81*j* to cool the first exhaust pipe 81. The cooling water passage 81*j* is integral and unitary with the first exhaust pipe 81. Specifically, the cooling water passage 81*j* is, for example, cast as a portion of the first exhaust pipe 81. The cooling water passage 81*j* surrounds an exhaust gas passage 81*k* of the first exhaust pipe 81. The cooling water passage 81*j* is an example of the "first cooling water passage."

The catalyst storage 82 includes a cooling water passage 82*d*. Water flows through the cooling water passage 82*d* to cool the catalyst storage 82 and the catalyst member 82*a* of the catalyst storage 82. The cooling water passage 82*d* is integral and unitary with the catalyst storage 82. Specifically, the cooling water passage 82*d* is, for example, cast as a portion of the catalyst storage 82. The cooling water passage 82*d* surrounds the exhaust gas passage 82*e* of the catalyst storage 82. The cooling water passage 82*d* is an example of the "second cooling water passage."

According to a preferred embodiment of the present invention, at least a portion of the cooling water passage 81*j* of the first exhaust pipe 81 and at least a portion of the cooling water passage 82*d* of the catalyst storage 82 share and define a common cooling water passage 86 in a cross-section orthogonal to the flow direction of the exhaust gas, as shown in FIG. 7. Water flows through the common cooling water passage 86 to cool the first exhaust pipe 81, the catalyst storage 82, and the catalyst member 82*a* of the catalyst storage 82.

The common cooling water passage 86 is provided in a portion of the first exhaust pipe 81 in which the side surface 82*b* of the catalyst storage 82 and the side surface 81*h* of the trunk 81e of the first exhaust pipe 81 are integral and unitary with each other. The common cooling water passage 86 is defined by at least the inner surface 81l (the outer surface of the exhaust gas passage 81k) of the cooling water passage 81j of the first exhaust pipe 81 and the inner surface 82f (the outer surface of the exhaust gas passage 82e) of the cooling water passage 82d of the catalyst storage 82.

As shown in FIG. 6, the second exhaust pipe 83 includes a cooling water passage 83c. Water flows through the cooling water passage 83c to cool the second exhaust pipe 83. The cooling water passage 83c surrounds an exhaust gas passage 83d of the second exhaust pipe 83.

According to a preferred embodiment of the present invention, the first exhaust pipe 81, the catalyst storage 82, the second exhaust pipe 83, and the water lock 84 are located outward (leftward) in the width direction with respect to the exhaust ports 56b of the engine 5 in the plan view. The term "outward in the width direction" denotes a direction spaced from the center of the engine 5 in the width direction. The first exhaust pipe 81, the catalyst storage 82, and the second exhaust pipe 83 overlap with the side surface 5a of the engine 5 in the side view. Specifically, the first exhaust pipe 81 (the entirety of the lead-out portion 81a, the bent portion 81b, and the increased diameter portion 81c) and the catalyst storage 82 totally overlap with the side surface 5a of the engine 5 in the side view. The second exhaust pipe 83 (the decreased diameter portion 83a and the straight portion 83b) partially overlaps with the side surface 5a of the engine 5 in the side view.

The catalyst storage 82 is located rearward relative to the front end of the engine 5 and forward relative to a back end of the engine 5. Specifically, the catalyst storage 82 is located forward relative to a rearward most exhaust port 56b of the plurality of exhaust ports 56b and rearward relative to the forward most exhaust port 56b of the plurality of exhaust ports 56b. In other words, the catalyst storage 82 is preferably located between the rearward most exhaust port 56b of the plurality of exhaust ports 56b and the forward most exhaust port 56b of the plurality of exhaust ports 56b in the front-back direction.

An upper end of the first exhaust pipe 81, an upper end of the catalyst storage 82, an upper end of the second exhaust pipe 83, and an upper end of the water lock 84 are preferably located below an upper end of the engine 5 in the side view. A lower end of the first exhaust pipe 81, a lower end of the catalyst storage 82, a lower end of the second exhaust pipe 83, and a lower end of the water lock 84 are preferably located above a lower end of the engine 5 in the side view.

According to a preferred embodiment of the present invention, the exhaust passage 8 is structured such that an exhaust gas passage from the first exhaust pipe 81 to the water lock 84 does not include a rising slope, as shown in FIGS. 6 and 7. Thus, a bottom of the exhaust gas passage 81k of the first exhaust pipe 81 is located below the exhaust ports 56b. A bottom of the exhaust gas passage 82e of the catalyst storage 82 is located at a same or substantially the same height as the bottom of the exhaust gas passage 81k of the first exhaust pipe 81. A bottom of the exhaust gas passage 83d of the second exhaust pipe 83 is located at a same or substantially the same height as the bottom of the exhaust gas passage 82e of the catalyst storage 82. A bottom of an exhaust gas passage of the water lock 84 is located at a same or substantially the same height as the bottom of the exhaust gas passage 83d of the second exhaust pipe 83.

More specifically, a bottom of the exhaust gas passage 81k of the lead-out portion 81a of the first exhaust pipe 81 is located below the exhaust ports 56b. A bottom of the exhaust gas passage 81k of the bent portion 81b of the first exhaust pipe 81 is located below the bottom of the exhaust gas passage 81k of the lead-out portion 81a. A bottom of the exhaust gas passage 81k of the increased diameter portion 81c of the first exhaust pipe 81 is located below the bottom of the exhaust gas passage 81k of the bent portion 81b.

The bottom of the exhaust gas passage 82e of the catalyst storage 82 is located at a same or substantially the same height as the bottom of the exhaust gas passage 81k of the increased diameter portion 81c. A bottom of the exhaust gas passage 83d of the decreased diameter portion 83a of the second exhaust pipe 83 is located at a same or substantially the same height as the bottom of the exhaust gas passage 82e of the catalyst storage 82. A bottom of the exhaust gas passage 83d of the straight portion 83b of the second exhaust pipe 83 is located at a same or substantially the same height as the bottom of the exhaust gas passage 83d of the decreased diameter portion 83a of the second exhaust pipe 83. The bottom of the exhaust gas passage of the water lock 84 is located below the bottom of the exhaust gas passage 83d of the straight portion 83b of the second exhaust pipe 83.

According to various preferred embodiments of the present invention, the following advantageous effects are obtained.

According to a preferred embodiment of the present invention, the first exhaust pipe 81 and the catalyst storage 82 are integral and unitary with each other. Thus, no connecting member such as a bolt is required unlike the case where the first exhaust pipe 81 and the catalyst storage 82 are separately provided, and hence the number of components of the exhaust passage 8 is reduced. Consequently, the structure of the exhaust passage 8 is simplified. Furthermore, no connecting member such as a bolt is required, and no flange or the like used when the first exhaust pipe 81 and the catalyst storage 82 are fastened to each other with a connecting member such as a bolt is required such that the weight of the exhaust passage 8 is reduced. Thus, an increase in the weight of the watercraft body 2 in which the engine 5 is housed is significantly reduced or prevented.

According to a preferred embodiment of the present invention, the side surface 82b of the catalyst storage 82 faces the side surface 81h of the first exhaust pipe 81. Furthermore, the side surface 82b of the catalyst storage 82 and the side surface 81h of the first exhaust pipe 81 are integral and unitary with each other. Thus, the catalyst storage 82 is located close to the first exhaust pipe 81, and hence the exhaust passage 8 is reduced in size. Due to the reduction in the size of the exhaust passage 8, the exhaust passage 8 is reduced in weight, and hence an increase in the weight of the watercraft body 2 in which the engine 5 is housed is significantly reduced or prevented.

According to a preferred embodiment of the present invention, the cooling water passage 81j of the first exhaust pipe 81 and the cooling water passage 82d of the catalyst storage 82 share and define the common cooling water passage 86 in the portion in which the side surface 82b of the catalyst storage 82 and the side surface 81h of the first exhaust pipe 81 are integral and unitary with each other. Thus, the catalyst storage 82 is located closer to the first exhaust pipe 81 as compared with the case where the cooling water passage 81j and the cooling water passage 82d are provided independently of each other, and hence the exhaust passage 8 is further reduced in size. Due to the further reduction in the size of the exhaust passage 8, the exhaust passage 8 is further reduced in weight, and hence an increase in the weight of the watercraft body 2 in which the engine 5 is housed is further significantly reduced or prevented.

According to a preferred embodiment of the present invention, the catalyst storage 82 overlaps with the side surface 5a of the engine 5, on which the exhaust ports 56b are provided, in the side view. Furthermore, the bent portion 81b that extends forward of the exhaust ports 56b, is bent back, and extends rearward is provided in the first exhaust pipe 81. Thus, the catalyst storage 82 overlaps with the side surface 5a of the engine 5 in the side view such that an increase in the size of the watercraft body 2 in the vertical direction or the longitudinal direction is significantly reduced or prevented as compared with the case where the catalyst storage 82 is partially or totally outside of the side surface 5a of the engine 5 in the side view. Furthermore, the catalyst storage 82 overlaps with the side surface 5a of the engine 5, on which the exhaust ports 56b are provided, in the side view such that the catalyst storage 82 is located closer to the exhaust ports 56b as compared with the case where the catalyst storage 82 is partially or totally outside of the side surface 5a of the engine 5 in the side view. Consequently, the length of the exhaust pipe (first exhaust pipe 81) that connects the exhaust ports 56b to the catalyst storage 82 is reduced. Thus, an increase in the weight of the exhaust pipe (first exhaust pipe 81) that connects the exhaust ports 56b to the catalyst storage 82 is significantly reduced or prevented. Consequently, an increase in the weight of the watercraft body 2 in which the engine 5 is housed is significantly reduced or prevented. In addition, the bent portion 81b is provided in the first exhaust pipe 81 such that the first exhaust pipe 81 extends forward and thereafter extends rearward due to the bent portion 81b, and hence the first exhaust pipe 81 and the catalyst storage 82 are connected to each other at a position that is farther forward as compared with the case where the first exhaust pipe 81 extends only rearward of the exhaust ports 56b. Consequently, the catalyst storage 82 is located at a more forward position, and hence the catalyst storage 82 is easily located at a position at which the catalyst storage 82 overlaps with the side surface 5a of the engine 5.

According to a preferred embodiment of the present invention, the bent portion 81b of the first exhaust pipe 81 extends forward of the forward most exhaust port 56b of the plurality of exhaust ports 56b, is bent back, and extends rearward. Thus, even in the structure in which the plurality of exhaust ports 56b are provided on the side surface 5a of the engine 5, the catalyst storage 82 is located forward such that the catalyst storage 82 is easily located at the position at which the catalyst storage 82 overlaps with the side surface 5a of the engine 5.

According to a preferred embodiment of the present invention, the bent portion 81b overlaps with the side surface 5a of the engine 5 in the side view. Thus, the bent portion 81b is located such that an increase in the size of the watercraft body 2 in the vertical direction or the longitudinal direction is significantly reduced or prevented.

According to a preferred embodiment of the present invention, the bent portion 81b is bent back near the front end of the engine 5. Thus, the length of the bent portion 81b of the first exhaust pipe 81 is reduced as compared with the case where the bent portion 81b of the first exhaust pipe 81 is bent back at a position that is forward relative to the front end of the engine 5. Consequently, an increase in the weight of the first exhaust pipe 81 is significantly reduced or prevented. Thus, an increase in the weight of the watercraft body 2 in which the engine 5 is housed is significantly reduced or prevented.

According to a preferred embodiment of the present invention, the portion 81f of the bent portion 81b before extending rearward and the portion 81g of the bent portion 81b after extending rearward overlap with each other in the side view. Thus, the portion 81f of the bent portion 81b before extending rearward and the portion 81g of the bent portion 81b after extending rearward are located close to each other, and hence the length of the bent portion 81b is reduced. Consequently, an increase in the weight of the first exhaust pipe 81 is significantly reduced or prevented. Thus, an increase in the weight of the watercraft body 2 in which the engine 5 is housed is significantly reduced or prevented.

According to a preferred embodiment of the present invention, the lead-out portion 81a that connects the exhaust ports 56b of the engine 5 to the bent portion 81b and the increased diameter portion 81c that connects the bent portion 81b to the catalyst storage 82 are provided in the first exhaust pipe 81. Thus, the diameter of the first exhaust pipe 81 is increased only in a portion (increased diameter portion 81c) in which the first exhaust pipe 81 is connected to the catalyst storage 82, and hence the lead-out portion 81a and the bent portion 81b are small in size. Consequently, an increase in the weight of the first exhaust pipe 81 is significantly reduced or prevented, and hence an increase in the weight of the watercraft body 2 in which the engine 5 is housed is significantly reduced or prevented.

According to a preferred embodiment of the present invention, the bottom of the exhaust gas passage 81k of the first exhaust pipe 81 is located below the exhaust ports 56b. Thus, when moisture in the exhaust gas is condensed to generate condensed water, accumulation of the condensed water between the exhaust ports 56b and the first exhaust pipe 81 is significantly reduced or prevented. Consequently, blockage of exhaust gas flow caused by the accumulation of the condensed water is significantly reduced or prevented.

According to a preferred embodiment of the present invention, the bottom of the exhaust gas passage 82e of the catalyst storage 82 is located at a same or substantially the same height as the bottom of the exhaust gas passage 81k of the first exhaust pipe 81. Furthermore, the bottom of the exhaust gas passage 83d of the second exhaust pipe 83 is located at a same or substantially the same height as the bottom of the exhaust gas passage 82e of the catalyst storage 82. In addition, the bottom of the exhaust gas passage of the water lock 84 is located at a same or substantially the same height as the bottom of the exhaust gas passage 83d of the second exhaust pipe 83. Thus, a rising slope in the exhaust gas passage from the exhaust ports 56b to the water lock 84 is significantly reduced or prevented. Consequently, accumulation of the condensed water between the exhaust ports 56b and the water lock 84 is significantly reduced or prevented. Thus, blockage of exhaust gas flow caused by the accumulation of the condensed water is significantly reduced or prevented. Furthermore, degradation of the performance of the catalyst in the catalyst storage 82 caused by a decrease in the temperature of the catalyst resulting from the accumulation of the condensed water is significantly reduced or prevented.

According to a preferred embodiment of the present invention, the catalyst storage 82 and the water lock 84 are located close to a side of the engine 5, on which the exhaust ports 56b are provided, in the plan view. Thus, both the catalyst storage 82 and the water lock 84 are located only on the side of the engine 5 on which the exhaust ports 56b are provided. Consequently, an area in which the engine 5, the catalyst storage 82, and the water lock 84 are located is reduced as compared with the case where the catalyst storage 82 and the water lock 84 are located on opposite sides of the engine 5, respectively, and hence an increase in the size of the watercraft body 2 is significantly reduced or prevented. In this structure, the catalyst storage 82 and the water lock 84 are located close to the side of the engine 5 on which the exhaust ports 56b are provided, and hence the length of the exhaust pipe (second exhaust pipe 83) that connects the catalyst storage 82 to the water lock 84 is reduced as compared with the case where the catalyst storage 82 and the water lock 84 are located on opposite sides of the engine 5, respectively. Consequently, an increase in the weight of the exhaust pipe (second exhaust pipe 83) that connects the catalyst storage 82 to the water lock 84 is significantly reduced or prevented. Thus, an increase in the weight of the watercraft body 2 in which the engine 5 is housed is significantly reduced or prevented.

According to a preferred embodiment of the present invention, the upper end of the catalyst storage 82 and the upper end of the water lock 84 are located below the upper end of the engine 5 in the side view. Furthermore, the lower end of the catalyst storage 82 and the lower end of the water lock 84 are located above the lower end of the engine 5 in the side view. Thus, an increase in the size of the watercraft body 2 in the vertical direction is significantly reduced or prevented as compared with the case where the upper ends of the catalyst storage 82 and the water lock 84 are located below the lower end of the engine 5 or the lower ends of the catalyst storage 82 and the water lock 84 are located above the upper end of the engine 5.

According to a preferred embodiment of the present invention, the catalyst storage 82 overlaps with the first exhaust pipe 81 in the side view. Thus, the catalyst storage 82 and the first exhaust pipe 81 are located close to each other, and hence the length of the first exhaust pipe 81 is reduced. Consequently, an increase in the weight of the first exhaust pipe 81 is significantly reduced or prevented. Thus, an increase in the weight of the watercraft body 2 in which the engine 5 is housed is significantly reduced or prevented.

The preferred embodiments of the present invention described above are illustrative in all points and not restrictive. The extent of the present invention is not defined by the above description of the preferred embodiments but by the scope of claims, and all modifications within the meaning and range equivalent to the scope of the claims are further included.

For example, while the engine preferably includes a plurality of (for example, three) exhaust ports in a preferred embodiment described above, the present invention is not restricted to this. According to a preferred embodiment of the present invention, the engine may alternatively include one exhaust port or a number of exhaust ports other than three.

While the engine is preferably an in-line engine in a preferred embodiment described above, the present invention is not restricted to this. According to a preferred embodiment of the present invention, the engine may alternatively be a V-type engine, or an engine other than an in-line engine and a V-type engine.

While the side surface of the catalyst storage and the side surface of the first exhaust pipe are preferably integral and unitary with each other in a preferred embodiment described above, the present invention is not restricted to this. According to a preferred embodiment of the present invention, the side surface of the catalyst storage and the side surface of the first exhaust pipe may not be integral and unitary with each other. The side surface of the catalyst storage and the side surface of the first exhaust pipe may alternatively be in contact with each other without being integral and unitary with each other. Alternatively, the side surface of the catalyst storage and the side surface of the first exhaust pipe may be separate from each other.

While the cooling water passage (first cooling water passage) of the first exhaust pipe and the cooling water passage (second cooling water passage) of the catalyst storage preferably share and define the common cooling water passage in a preferred embodiment described above, the present invention is not restricted to this. According to a preferred embodiment of the present invention, the first cooling water passage of the first exhaust pipe and the second cooling water passage of the catalyst storage may alternatively be provided independently of each other without defining a common cooling water passage.

While all of the first exhaust pipe, the catalyst storage, the second exhaust pipe, and the water lock are preferably located outward in the width direction with respect to the exhaust ports of the engine in the plan view in a preferred embodiment described above, the present invention is not restricted to this. According to a preferred embodiment of the present invention, all of the first exhaust pipe, the catalyst storage, the second exhaust pipe, and the water lock may not be located outward in the width direction with respect to the exhaust ports of the engine in the plan view. For example, the catalyst storage, the second exhaust pipe, or the water lock may be located rearward relative to the engine in the plan view.

While the first exhaust pipe preferably totally overlaps with the side surface of the engine in the side view in a preferred embodiment described above, the present invention is not restricted to this. According to a preferred embodiment of the present invention, the first exhaust pipe may not totally overlap with the side surface of the engine in the side view. In other words, the first exhaust pipe may only partially overlap with the side surface of the engine in the side view.

While the catalyst storage preferably totally overlaps with the side surface of the engine in the side view in a preferred embodiment described above, the present invention is not restricted to this. According to a preferred embodiment of the present invention, the catalyst storage may not totally overlap with the side surface of the engine in the side view. In other words, the catalyst storage may only partially overlap with the side surface of the engine in the side view.

While the second exhaust pipe preferably partially overlaps with the side surface of the engine in the side view in a preferred embodiment described above, the present invention is not restricted to this. According to a preferred embodiment of the present invention, the second exhaust pipe may alternatively totally overlap with the side surface of the engine in the side view, or the second exhaust pipe may not overlap with the side surface of the engine in the side view.

While the catalyst storage is preferably located forward relative to the rearward most exhaust port of the plurality of exhaust ports and rearward relative to the forward most exhaust port of the plurality of exhaust ports in a preferred embodiment described above, the present invention is not restricted to this. According to a preferred embodiment of the present invention, the catalyst storage may not be located forward relative to the rearward most exhaust port of the plurality of exhaust ports and rearward relative to the forward most exhaust port of the plurality of exhaust ports.

While the first exhaust pipe preferably includes the lead-out portion, the bent portion, and the increased diameter portion in a preferred embodiment described above, the present invention is not restricted to this. According to a preferred embodiment of the present invention, the first exhaust pipe may not include the bent portion and the increased diameter portion so far as the same includes the lead-out portion connected to the exhaust ports. For example, the first exhaust pipe may include the lead-out portion and the bent portion without including the increased diameter portion, or may include the lead-out portion and the increased diameter portion without including the bent portion. Alternatively, the first exhaust pipe may include only the lead-out portion.

While the bottom of the exhaust gas passage of the catalyst storage is preferably located at a same or substantially the same height as the bottom of the exhaust gas passage of the first exhaust pipe, the bottom of the exhaust gas passage of the second exhaust pipe is preferably located at a same or substantially the same height as the bottom of the exhaust gas passage of the catalyst storage, and the bottom of the exhaust gas passage of the water lock is preferably located at a same or substantially the same height as the bottom of the exhaust gas passage of the second exhaust pipe in a preferred embodiment described above, the present invention is not restricted to this. According to a preferred embodiment of the present invention, the bottom of the exhaust gas passage of the catalyst storage may alternatively be located below the bottom of the exhaust gas passage of the first exhaust pipe. Furthermore, the bottom of the exhaust gas passage of the second exhaust pipe may alternatively be located below the bottom of the exhaust gas passage of the catalyst storage. In addition, the bottom of the exhaust gas passage of the water lock may alternatively be located below the bottom of the exhaust gas passage of the second exhaust pipe.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A jet propelled watercraft comprising:
   a watercraft body;
   an engine housed in the watercraft body;
   a jet propulsion unit that suctions and jets water with a drive force of the engine;
   a first exhaust pipe connected to an exhaust port of the engine; and
   a catalyst storage connected to the first exhaust pipe; wherein
   the first exhaust pipe includes a first leading portion that leads exhaust gas outputted from the exhaust port forward and a second leading portion that changes a direction of the exhaust gas led by the first leading portion from forward to rearward;
   the catalyst storage guides the exhaust gas from the second leading portion rearward; and
   at least a portion of the first leading portion and at least a portion of the catalyst storage are in contact with each other.

2. The jet propelled watercraft according to claim 1, wherein
   a side surface of the catalyst storage faces a side surface of the first exhaust pipe; and
   the side surface of the catalyst storage and the side surface of the first exhaust pipe are in contact and integral and unitary with each other.

3. The jet propelled watercraft according to claim 2, wherein
   the first exhaust pipe includes a first cooling water passage;
   the catalyst storage includes a second cooling water passage; and
   the first cooling water passage and the second cooling water passage define a common cooling water passage in a portion of the first exhaust pipe where the side surface of the catalyst storage and the side surface of the first exhaust pipe are in contact and integral and unitary with each other.

4. The jet propelled watercraft according to claim 1, wherein
   in a side view of the jet propelled watercraft, the catalyst storage overlaps with a side surface of the engine on which the exhaust port is provided; and
   the second leading portion includes a bent portion that extends forward of the exhaust port, is bent back, and extends rearward.

5. The jet propelled watercraft according to claim 4, wherein
   the engine includes a plurality of exhaust ports, including the exhaust port, provided on the side surface of the engine; and
   the bent portion of the first exhaust pipe extends forward of a forward most exhaust port of the plurality of exhaust ports, is bent back, and extends rearward.

6. The jet propelled watercraft according to claim 4, wherein the bent portion overlaps with the side surface of the engine in the side view of the jet propelled watercraft.

7. The jet propelled watercraft according to claim 4, wherein the bent portion is bent back near a front end of the engine.

8. The jet propelled watercraft according to claim 4, wherein a portion of the bent portion before being bent to extend rearward and a portion of the bent portion after being bent to extend rearward overlap with each other in the side view of the jet propelled watercraft.

9. The jet propelled watercraft according to claim 4, wherein the first exhaust pipe further includes an increased diameter portion that connects the bent portion to the catalyst storage.

10. The jet propelled watercraft according to claim 1, wherein a bottom of an exhaust gas passage of the first exhaust pipe is located below the exhaust port.

11. The jet propelled watercraft according to claim 10, further comprising:
    a second exhaust pipe connected to the catalyst storage; and
    a water lock connected to the second exhaust pipe; wherein
    a bottom of an exhaust gas passage of the catalyst storage is located at a same or substantially a same height as the bottom of the exhaust gas passage of the first exhaust pipe or is located below the bottom of the exhaust gas passage of the first exhaust pipe;
    a bottom of an exhaust gas passage of the second exhaust pipe is located at a same or substantially a same height as the bottom of the exhaust gas passage of the catalyst storage or is located below the bottom of the exhaust gas passage of the catalyst storage; and
    a bottom of an exhaust gas passage of the water lock is located at a same or substantially a same height as the bottom of the exhaust gas passage of the second exhaust pipe or is located below the bottom of the exhaust gas passage of the second exhaust pipe.

12. The jet propelled watercraft according to claim 1, further comprising:

a second exhaust pipe connected to the catalyst storage; and a water lock connected to the second exhaust pipe; wherein the catalyst storage and the water lock are located close to a side of the engine, on which the exhaust port is provided, in a plan view of the jet propelled watercraft.

13. The jet propelled watercraft according to claim 12, wherein an upper end of the catalyst storage and an upper end of the water lock are located below an upper end of the engine in a side view of the jet propelled watercraft; and a lower end of the catalyst storage and a lower end of the water lock are located above a lower end of the engine in the side view of the jet propelled watercraft.

14. The jet propelled watercraft according to claim 1, wherein the catalyst storage overlaps with the first exhaust pipe in a side view of the jet propelled watercraft.

15. A jet propulsion assembly comprising:

an engine housed in a watercraft body;

a jet propulsion unit that suctions and jets water with a drive force of the engine;

an exhaust pipe connected to an exhaust port of the engine; and a catalyst storage connected to the exhaust pipe; wherein the first exhaust pipe includes a first leading portion that leads exhaust gas outputted from the exhaust port forward and a second leading portion that changes a direction of the exhaust gas led by the first leading portion from forward to rearward;

the catalyst storage guides the exhaust gas from the second leading portion rearward; and at least a portion of the first leading portion and at least a portion of the catalyst storage are in contact with each other.

16. The jet propulsion assembly according to claim 15, wherein a side surface of the catalyst storage faces a side surface of the exhaust pipe; and the side surface of the catalyst storage and the side surface of the exhaust pipe are in contact and integral and unitary with each other.

17. The jet propulsion assembly according to claim 16, wherein the exhaust pipe includes a first cooling water passage;

the catalyst storage includes a second cooling water passage; and the first cooling water passage and the second cooling water passage define a common cooling water passage where the side surface of the catalyst storage and the side surface of the exhaust pipe are in contact and integral and unitary with each other.

18. The jet propulsion assembly according to claim 15, wherein in a side view of the jet propulsion assembly, the catalyst storage overlaps with a side surface of the engine on which the exhaust port is provided; and the second leading portion includes a bent portion that extends forward of the exhaust port, is bent back, and extends rearward.

19. A jet propulsion assembly comprising:

an engine housed in a watercraft body;

a jet propulsion unit that suctions and jets water with a drive force of the engine;

an exhaust pipe connected to an exhaust port of the engine; and a catalyst storage connected to the exhaust pipe; wherein the exhaust pipe includes:

a lead-out portion connected to the exhaust port, the lead-out portion through which exhaust gas discharged from the exhaust port is led out; and a bent portion that is connected to the lead-out portion, extends forward from the lead-out portion, is bent back, and extends rearward; wherein at least a portion of the lead-out portion and at least a portion of the catalyst storage are in contact with each other; and the bent portion is bent back near a front end of the engine.

20. The jet propulsion assembly according to claim 19, wherein the lead-out portion of the exhaust pipe and the catalyst storage are in contact and integral and unitary with each other.

* * * * *